(12) United States Patent
Kokenge

(10) Patent No.: US 11,253,069 B2
(45) Date of Patent: Feb. 22, 2022

(54) HANGING RACK ASSEMBLIES AND METHODS OF USE

(71) Applicant: Organized Living, Inc., Cincinnati, OH (US)

(72) Inventor: John Kokenge, Cincinnati, OH (US)

(73) Assignee: Organized Living, Inc., Cincinnati, OH (US)

( * ) Notice: Subject to any disclaimer, the term of this patent is extended or adjusted under 35 U.S.C. 154(b) by 0 days.

(21) Appl. No.: 16/269,100

(22) Filed: Feb. 6, 2019

(65) Prior Publication Data

US 2020/0245767 A1 Aug. 6, 2020

(51) Int. Cl.
*A47B 95/00* (2006.01)
*A47B 57/34* (2006.01)
*F16B 21/00* (2006.01)

(52) U.S. Cl.
CPC ............ *A47B 95/008* (2013.01); *A47B 57/34* (2013.01); *F16B 21/00* (2013.01)

(58) Field of Classification Search
CPC ....... A47B 95/008; A47B 57/34; A47B 96/06; F16B 21/00; F16B 19/002; F16B 21/02; F16B 21/065; F16B 21/07
See application file for complete search history.

(56) References Cited

U.S. PATENT DOCUMENTS

| | | | | | |
|---|---|---|---|---|---|
| 2,941,439 | A | * | 6/1960 | Rapata | F16B 19/1081 411/41 |
| 3,449,997 | A | * | 6/1969 | Couch | F16B 43/00 411/466 |
| 3,764,278 | A | * | 10/1973 | Ivanier | B21C 3/04 428/592 |
| 4,359,849 | A | * | 11/1982 | Goeman | E04F 13/0801 52/309.4 |
| 4,394,805 | A | * | 7/1983 | Napper | E06B 9/01 49/141 |
| 4,828,209 | A | * | 5/1989 | Niemi | A47F 5/0823 248/220.42 |
| 5,454,638 | A | * | 10/1995 | Bird | A47B 57/42 108/108 |
| 6,955,515 | B2 | * | 10/2005 | Barina | F16B 21/02 411/508 |
| 7,086,544 | B1 | * | 8/2006 | Doench | A47B 61/003 211/105.1 |

(Continued)

*Primary Examiner* — Ko H Chan
(74) *Attorney, Agent, or Firm* — Dinsmore & Shohl LLP

(57) ABSTRACT

A hanging rack assembly may include a mounting rail having a mounting base. The mounting base has a first end, a second end, a first edge that extends between the first and the second end, and a second edge that extends between the first end and the second end, the mounting base having opposite faces that extend between the first end, the second end, the first edge, and the second edge; and a mounting lip, wherein the mounting base comprises one or more non-circular openings sized to receive an anchor for mounting the mounting rail to a surface. A method of installing a mounting rail may include mounting the mounting rail on a surface; drilling through one or more non-circular openings located on a mounting base of the mounting rail; and inserting an anchor into one or more of the non-circular openings and the surface in order to secure the mounting rail to the surface.

14 Claims, 7 Drawing Sheets

(56) References Cited

U.S. PATENT DOCUMENTS

| | | | | |
|---|---|---|---|---|
| 7,387,212 B2* | 6/2008 | Costa | ............... | A47B 47/022 |
| | | | | 211/90.01 |
| 8,667,701 B1* | 3/2014 | Geesaman | ............ | A47B 97/00 |
| | | | | 33/474 |
| 9,033,294 B2* | 5/2015 | Cattaneo | ............ | A47B 95/008 |
| | | | | 248/221.11 |
| 9,057,393 B1* | 6/2015 | Lawrence | ............... | E05B 9/08 |
| 9,599,140 B2* | 3/2017 | Diep | ............... | F16B 37/043 |
| 9,668,576 B2* | 6/2017 | Trunkle | ............ | A47B 95/008 |
| 10,149,540 B2* | 12/2018 | Corless | ............... | A47B 96/067 |
| 10,253,801 B2* | 4/2019 | Leichti | ............... | F16B 43/00 |
| 2005/0271491 A1* | 12/2005 | Opper | ............... | F16B 37/067 |
| | | | | 411/30 |
| 2007/0063119 A1* | 3/2007 | Huang | ............ | A47G 25/0678 |
| | | | | 248/304 |
| 2007/0101598 A1* | 5/2007 | Miro | ............... | B23B 47/287 |
| | | | | 33/667 |
| 2009/0139943 A1* | 6/2009 | Fernandez | ............ | A47B 45/00 |
| | | | | 211/94.01 |
| 2010/0158633 A1* | 6/2010 | Huang | ............... | F16B 5/065 |
| | | | | 411/25 |
| 2012/0257944 A1* | 10/2012 | McDuff | ............... | F16B 13/128 |
| | | | | 411/21 |
| 2015/0292541 A1* | 10/2015 | Risdale | ............... | F16B 19/002 |
| | | | | 29/525.01 |
| 2018/0030717 A1* | 2/2018 | Yang | ............... | E04B 1/2403 |

* cited by examiner

HANGING RACK ASSEMBLIES AND METHODS OF USE

TECHNICAL FIELD

The present specification generally relates to hanging rack assemblies and, more specifically, to hanging rack assemblies that include a mounting base having one or more non-circular openings sized to receive an anchor for mounting the mounting rail to a surface.

BACKGROUND

Typical adjustable organizing systems, such as hanging rack assemblies, may include hanging uprights that are mounted on a mounting rail. These typical organizing systems include circular holes that are used to affix the mounting rail to a surface, such as a wall. In a typical process, studs are located in the wall and circular holes of the mounting rail are aligned with the studs. Then, all hole locations are marked, e.g., using a pencil. Holes are then drilled at the hole location with the mounting rail removed so that anchors may be inserted into holes that are adjacent to the studs. The mounting rail is again aligned with the hole locations and screws are inserted through the holes and anchors. What is desired are hanging rack assemblies that can eliminate one or more of these assembly steps.

Moreover, typical organizing systems include hanging uprights that either lock into place on the mounting rail or have a constrained range of horizontal motion due to fastener placement or unwieldy rail covers. Specifically, fasteners that secure the hanging rack assembly to a wall may interfere with movement of the hanging uprights while they are connected to the mounting rail. In these instances, it may become necessary to disassemble the hanging uprights from the mounting rail, reposition the mounting rails, and again reattach the hanging upright to the mounting rail. For example, once the mounting rail is secured to a wall and a hanging upright has been affixed to the mounting rail, the hanging upright may be locked into place or within a limited range of lateral motion, thereby requiring removal of the fasteners and disassembly of the hanging rack if the current position of the hanging upright becomes undesirable. Thus, typical hanging rack assemblies may provide a limited (or no) range of lateral motion of the hanging upright when attached to the hanging rack. What is desired are hanging rack assemblies that provide an adjustable hanging upright with side-to-side sliding freedom along a width of the mounting rail.

SUMMARY

In one embodiment, a hanging rack assembly includes a mounting rail. The mounting rail includes a mounting base having a first end, a second end, a first edge that extends between the first and the second end, and a second edge that extends between the first end and the second end, the mounting base having opposite faces that extend between the first end, the second end, the first edge, and the second edge; and a mounting lip. The mounting base includes one or more non-circular openings sized to receive an anchor for mounting the mounting rail to a surface.

In another embodiment, a method of installing a mounting rail includes mounting the mounting rail on a surface; drilling through one or more non-circular openings located on a mounting base of the mounting rail; and inserting an anchor into one or more of the non-circular openings and the surface in order to secure the mounting rail to the surface. The mounting rail includes the mounting base having a first end, a second end, a first edge that extends between the first and the second end, and a second edge that extends between the first end and the second end, the mounting base having opposite faces that extend between the first end, the second end, the first edge, and the second edge; and a mounting lip.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to hanging rack assemblies and methods utilizing hanging rack assemblies. As an example, a hanging rack assembly includes a mounting rail with multiple non-circular openings that are sized to receive a similarly shaped wall mounting anchor for mounting the mounting rail to a surface, such as a wall. The hanging rack assembly may further include a cover-guiding lip that is sized to receive a rail cover. The rail cover may be used to cover the non-circular openings and has a height that less than a height of the mounting rail. Providing the rail cover with a reduced height compared to the mounting rail may provide clearance beneath the non-circular openings to allow an adjustable hanging upright to slide side-to-side along a length of the mounting rail.

Figure 1:
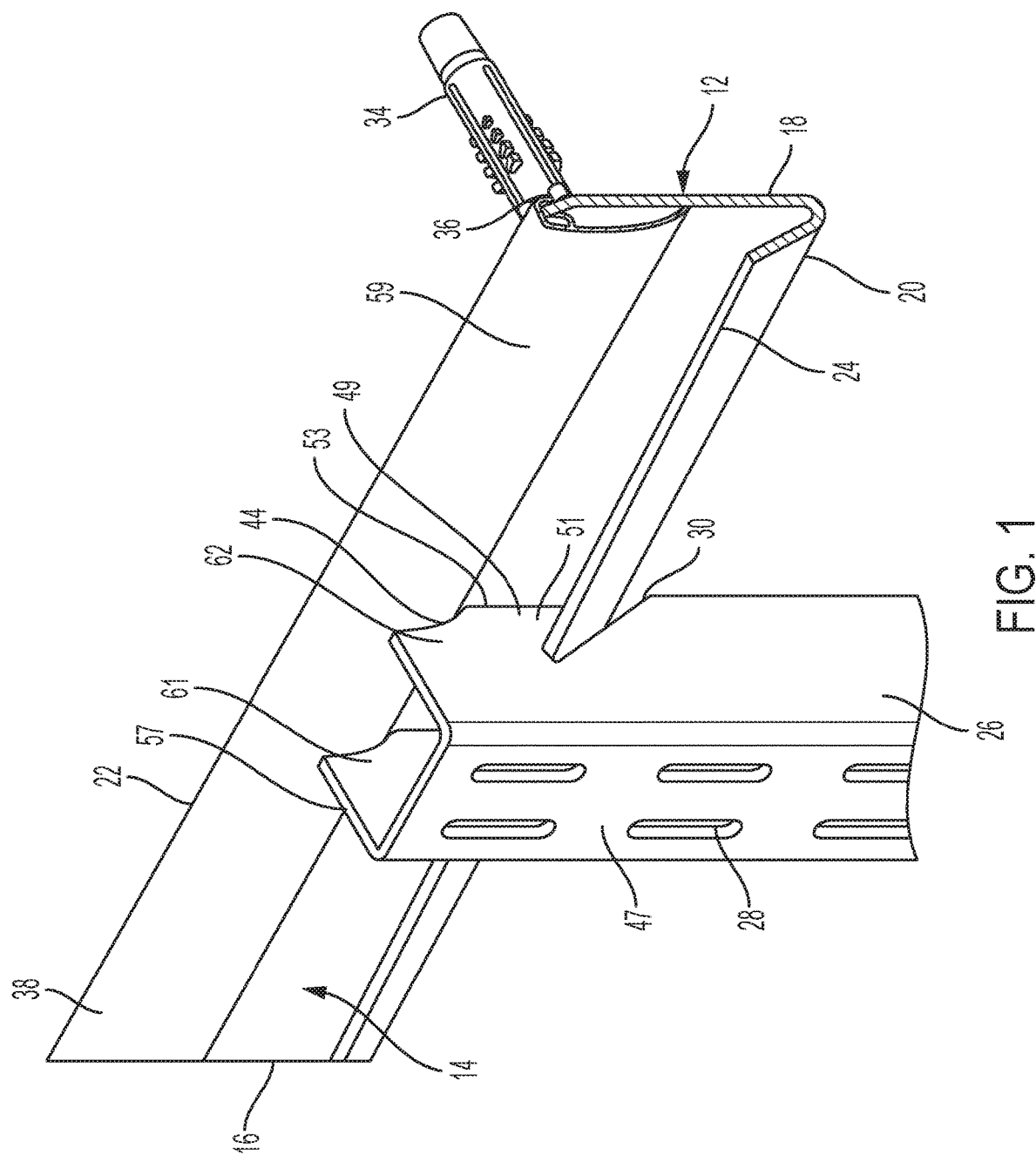
FIG. 1 illustrates a perspective view of a hanging rack assembly including a mounting rail and an adjustable hanging upright, according to one or more embodiments shown and described herein.

Referring to FIG. 1, the hanging rack assembly 10 may include a mounting rail 12 having a mounting base 14 that extends a length of the mounting rail 12. The mounting base 14 has a first end 16, a second end 18, a first edge 20 that extends between the first end 16 and the second end 18, and a second edge 22 that extends between the first end 16 and the second end 18. The mounting base 14 includes opposite faces that extend between the first end 16, the second end 18, the first edge 20, and the second edge 22. The mounting rail 12 includes a mounting lip 24 that extends outwardly from the first edge 20 toward the second edge 22. The hanging rack assembly 10 may further include an adjustable hanging upright 26 comprising a plurality of apertures 28 on a front surface for hanging shelving brackets thereon. The adjustable hanging upright 26 includes one or more slots 30 sized to slidingly receive the mounting lip 24. The mounting base 14 includes multiple non-circular openings 32 (FIG. 3A) that are sized to receive a wall mounting anchor 34 for mounting the mounting rail 12 to a wall, as will be described in greater detail below.

The hanging rack assembly 10 including adjustable hanging upright 26 may comprise any suitable material. Examples of suitable materials include, but are not limited to, metal, metal alloy, polymeric material, plastic, or combinations thereof. In embodiments, the mounting rail 12 and the adjustable hanging upright 26 comprise the same material or combination of materials.

Figure 2A:
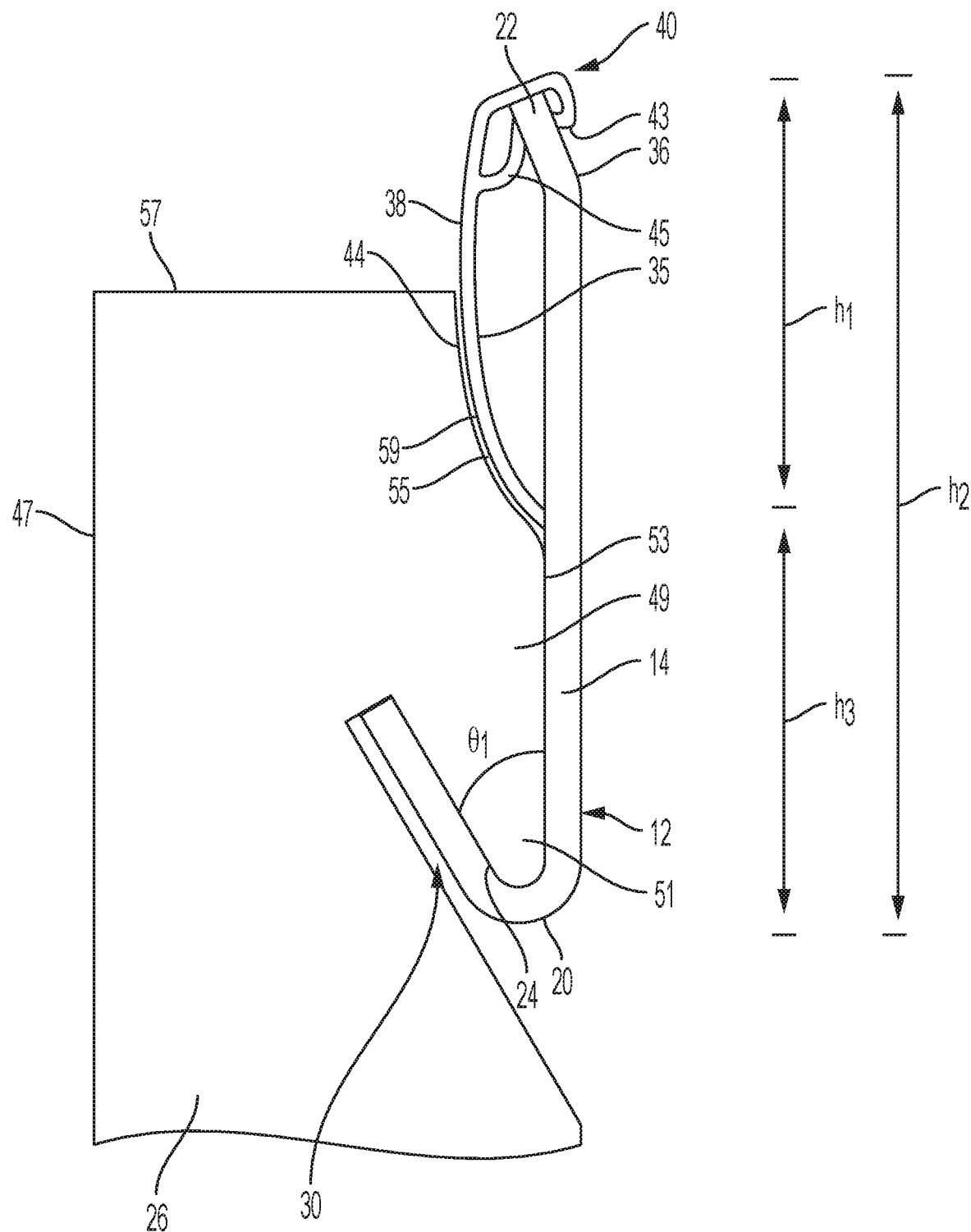
FIG. 2A illustrates a side view of the hanging rack assembly of FIG. 1 without a wall mounting anchor, according to one or more embodiments shown and described herein.

Referring also to FIG. 2A, the mounting rail 12 includes a cover-guiding lip 36 at the second edge 22. The cover-guiding lip 36 extends outwardly from a plane that is defined by the mounting base 14 to provide clearance between the cover-guiding lip 36 and a wall to which the mounting base 14 is mounted. A rail cover 38 includes a mounting flange 40 that is sized to receive the cover-guiding lip 36 of the mounting rail 12. A bottom edge 35 of the rail cover 38 contacts the mounting base 14 between the first and second edges 20 and 22. The rail cover 38 may have a height $h_1$ that is less than a height $h_2$ of the mounting rail 12. A clearance $h_3$ may be provided between the bottom edge 35 of the rail cover 38 and the first edge 20 of the mounting rail 12 such that the rail cover 38 encases one or more of the non-circular openings 32. This clearance $h_3$ may be used as a channel that allows the adjustable hanging upright 26 to slide side-to-side within the clearance $h_3$ without being removed from the mounting lip 24. The mounting flange 40 may further include a pair of retaining fingers 43 and 45 that are used to resiliently deflect and engage the cover-guiding lip 36 when it is positioned within the mounting flange 40.

The adjustable hanging upright 26 generally includes a shelf mounting side 47 and a rail hanging side 49. The shelf mounting side 47 includes the plurality of apertures 28 (FIG. 1) that may be used to receive shelving brackets and the rail hanging side 49 includes a rail hanging feature 51 that is sized to be received within the channel provided between the mounting lip 24 and the mounting base 14. The rail hanging feature 51 includes a relatively straight rear portion 53 that may co-extend along a height of the mounting base 14 and a recess portion 44 that extends outward away from the mounting base 14 and intersects the rear portion 53 and a top 57 of the adjustable hanging upright 26 (e.g., a chamfer) to provide added clearance for the rail cover 38. In the illustrated example, the rail cover 38 has an outer wall 59 that is curved relative to the mounting base 14. The recessed portion 44 may have a cooperating curve to provide a gap 55 between the recessed portion 44 and the rail cover 38. This gap 55 may facilitate lifting of the rail hanging feature 51 from the mounting lip 24, if desired, and also side-to-side sliding of the adjustable hanging upright 26 along the channel.

The adjustable hanging upright 26 includes the recessed portion 44 that is sized to receive the rail cover 38. The mounting lip 24 may extend outwardly from the first edge 20, toward the second edge 22 and away from the mounting base 14 at an angle $\theta_1$ from 10° to 45°, such as from 20° to 35°. This range may allow the adjustable hanging upright 26 to be hung from the mounting lip 24 such that the slide-assisting recess 44 may move by the rail cover 38 when lifting the adjustable hanging upright 26 and repositioning the adjustable hanging upright 26 laterally along the length of the mounting lip 24. Moreover, such a configuration may allow the adjustable hanging upright 26 to slide the entire length of the mounting rail 12 between the first end 16 and the second end 18. Sliding the adjustable hanging upright 26 may be possible, even when the adjustable hanging upright 26 is in use. For example, a load may be attached to or hung from the adjustable hanging upright 26 via the plurality of apertures 28. Even in such a configuration, the slide-assisting recess 44 may allow the adjustable hanging upright 26 to be slidably adjusted side-to-side along the mounting lip 24. In some embodiments, the adjustable hanging upright 26 comprises a substantially U-shaped body as can be seen by FIG. 1. The U-shaped body may include the shelf mounting side 47 and two parallel side walls 61 and 62. As such, the adjustable sliding rail 26 may have two hanging features, one for each side wall 61 and 62 that may be substantially identical to one another.

Figure 2B:
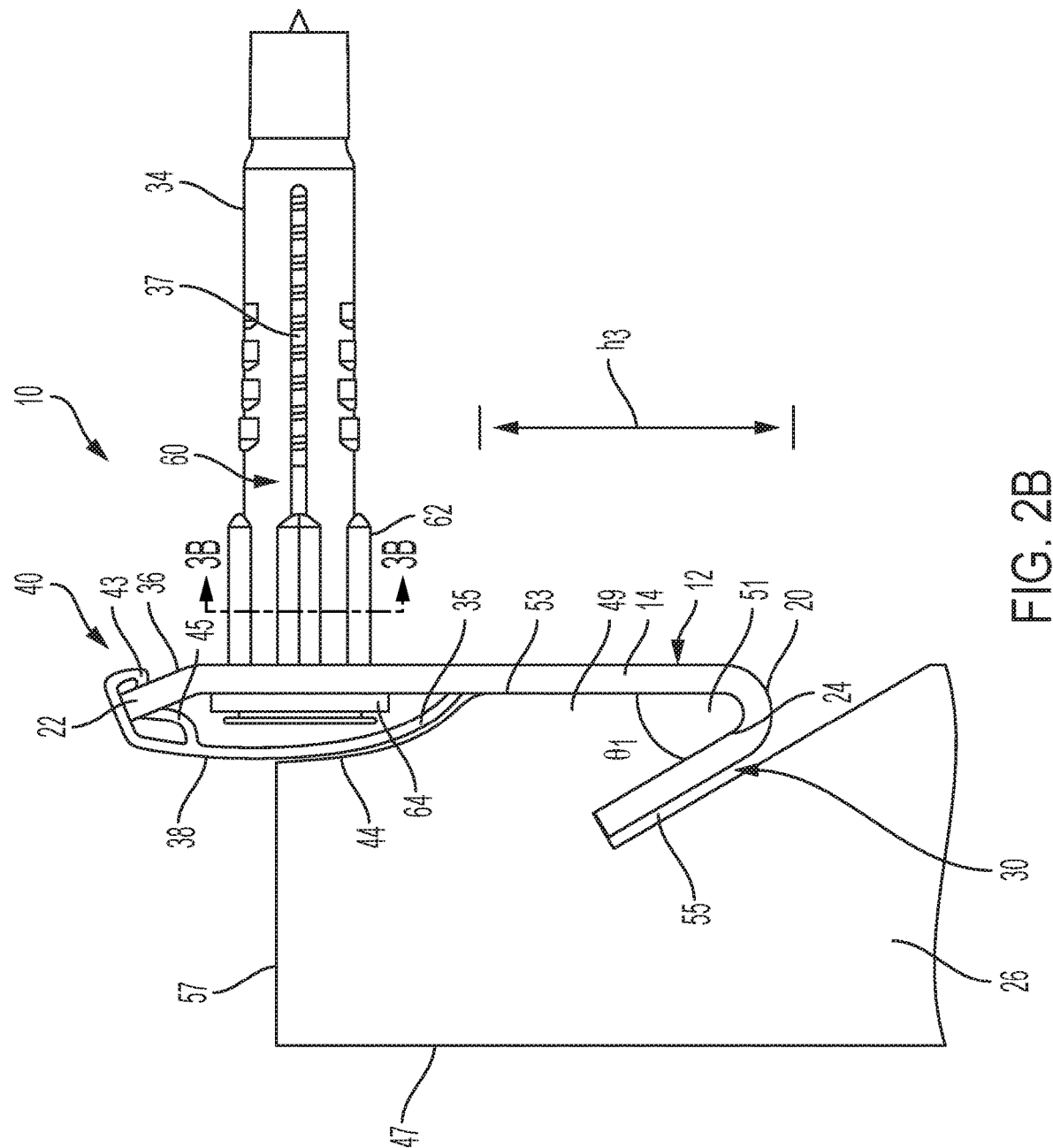
FIG. 2B illustrates a side view of the hanging rack assembly of FIG. 2A with a wall mounting anchor, according to one or more embodiments shown and described herein.

Referring to FIG. 2B, the rail cover 38 may partially encase the height of the mounting rail 12, as previously described. The cover-guiding lip 36 may interface with the mounting flange 40 such that the clearance $h_3$ is created between the bottom edge 35 of the rail cover 38 and the first edge 20 of the mounting rail 12. This clearance $h_3$ may shield an anchor 34, shown in FIG. 2B, from view, yet allow the adjustable hanging upright 26 to be fully slidable along the mounting lip 24 without a need to fully remove the hanging feature 51 from the mounting lip 24. Further, the rail cover 38 may provide additional stability to the adjustable hanging upright 26 as the adjustable hanging upright 26 is slid along the mounting lip 24.

The rail cover 38 may comprise any suitable material. Examples of suitable materials include, but are not limited to, plastic, glass, metal, metal alloys, or combinations thereof. In embodiments, the rail cover 38 may comprise a lightweight material such that reduced friction is created as it interfaces with the adjustable hanging upright 26. Such a material allows the adjustable hanging upright 26 to slide freely across the mounting lip 24. In further embodiments, the rail cover 38 may comprise a clear material, such that the non-circular openings 32 may be seen, or an opaque material to hide the non-circular openings 32.

Figure 3A:
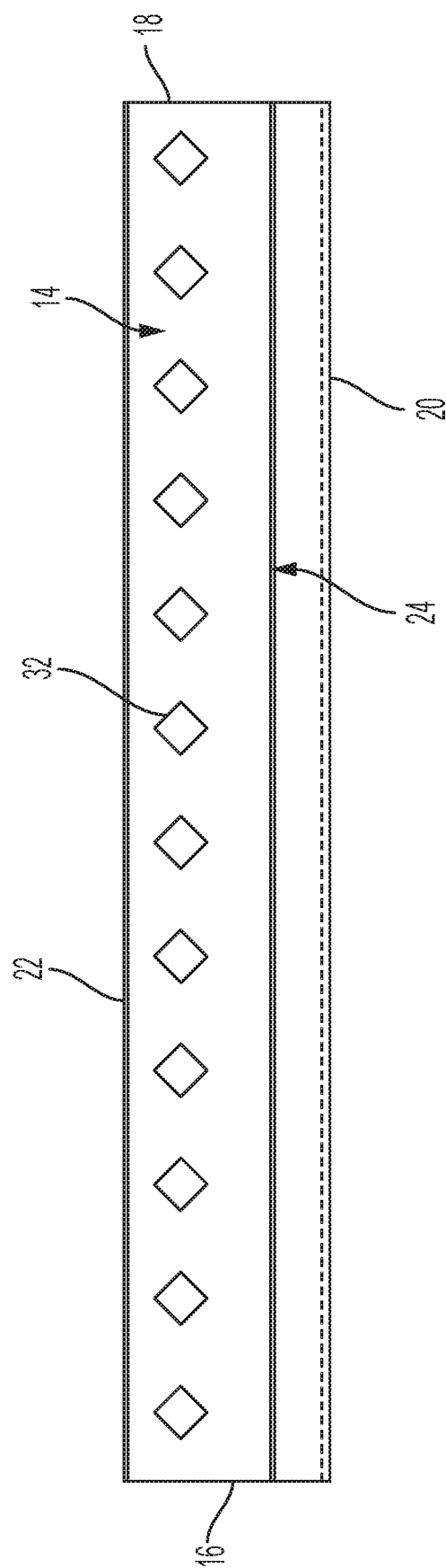
FIG. 3A illustrates a front view of the mounting rail of FIG. 1 in isolation, according to one or more embodiments shown and described herein.

Referring to FIG. 3A, the mounting rail 12 includes non-circular openings 32. The non-circular openings 32 are configured to receive a wall mounting anchor 34 (FIG. 2B), which allows the mounting rail 12 to be affixed to a surface, such as a wall. The non-circular openings 32 enable the wall mounting anchor 34 with a cooperating cross-sectional shape to be inserted into one of the non-circular openings 32 such that the wall mounting anchor 34 does not spin during installation or use of the mounting rail 12. The wall mounting anchor 34 may have a corresponding non-circular peripheral shape to inhibit rotation when they are inserted into the non-circular openings 32. As used herein, the term "non-circular opening" refers to an opening shape where at least a portion of its perimeter is non-circular. The term "non-circular opening" is not meant to exclude opening shapes that are partially circular and partially non-circular.

According to embodiments, the non-circular openings 32 may comprise any suitable non-circular shape. Examples of suitable non-circular shapes include substantially trapezoidal shapes such as rhombuses, squares, rectangles, parallelograms, or combinations thereof. In certain embodiments, the non-circular openings 32 comprise rectangular shapes. In other embodiments, the non-circular openings 32 comprise square shapes.

Figure 3B:
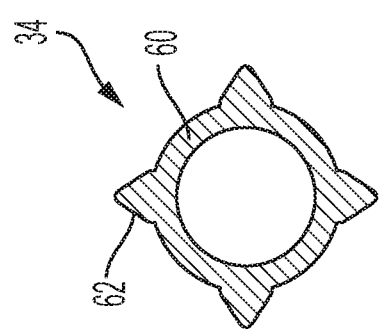
FIG. 3B illustrates a section view of an anchor for use in the hanging rack assembly of FIG. 2B, according to one or more embodiments shown and described herein.

FIG. 3B illustrates a section view of the anchor 34 of FIG. 2B. The anchor 34 includes a body 60 and projections 62 that extend integrally outward from the body in radial directions. The projections 62 provide the anchor 34 with the non-circular shape that interfaces with the non-circular openings 32 in order to inhibit rotation of the anchors 34 relative to the non-circular openings 32, e.g., as screws are threaded through the anchors 34. The anchor 34 further includes a circular head 64 having a dimension that is greater than that of the non-circular openings 32. As such, the anchor 34 can be inserted into the non-circular opening 32 with the head 64 preventing further passage of the anchor through the non-circular opening 32. Such an arrangement can allow the anchor 34 to be placed through the non-circular opening 32 and into a pre-drilled hole in a wall with the mounting rail 12 in place on the wall. The cooperating non-circular arrangements of the anchor 34 and the non-circular opening 32 allow a fastener 37 to be drilled into the anchor 34 without rotating the anchor 34 even though the anchor 34 is being held within the non-circular opening 32 by the head 64.

Referring again to FIGS. 2B, 3A, and 3B, the fastener 37, such as a screw or other suitable fastening device, may be inserted into the non-circular openings 32 once a corresponding opening (e.g., a hole) has been drilled into a surface, such as a wall. The fastener 37 inserted into the non-circular opening 32 and into the anchor 34 thereby locks the mounting rail 12 onto the surface. The anchor 34 may then rosette into a final shape behind the surface in order to finally secure the mounting rail 12 onto the surface.

The above-described hanging rack assembly arrangement allows the mounting rail to be secured in place on a wall without any need to first mark the openings with the mounting rail in place, remove the mounting rail, then drill the holes into the wall at the marked locations and insert the anchors through the holes before replacing the mounting rail. In particular, once the studs in the wall are located, the mounting rail 12 can be located on the wall with non-circular openings 32 aligned with the studs. Screws 37 with round heads that are sized larger in dimension than the non-circular openings can then be drilled into the studs through the non-circular openings 32. Appropriate sized holes for receiving the anchors 34 may then be drilled into the wall through the remaining non-circular openings 32. The anchors 34 may then be placed into the drilled holes such that the projections 62 interface with the non-circular openings 32. Then, screws 37 can be drilled into the anchors 34 with the non-circular openings 32 preventing rotation of the anchors 34 in order to lock the anchors to the wall.

Figure 4:
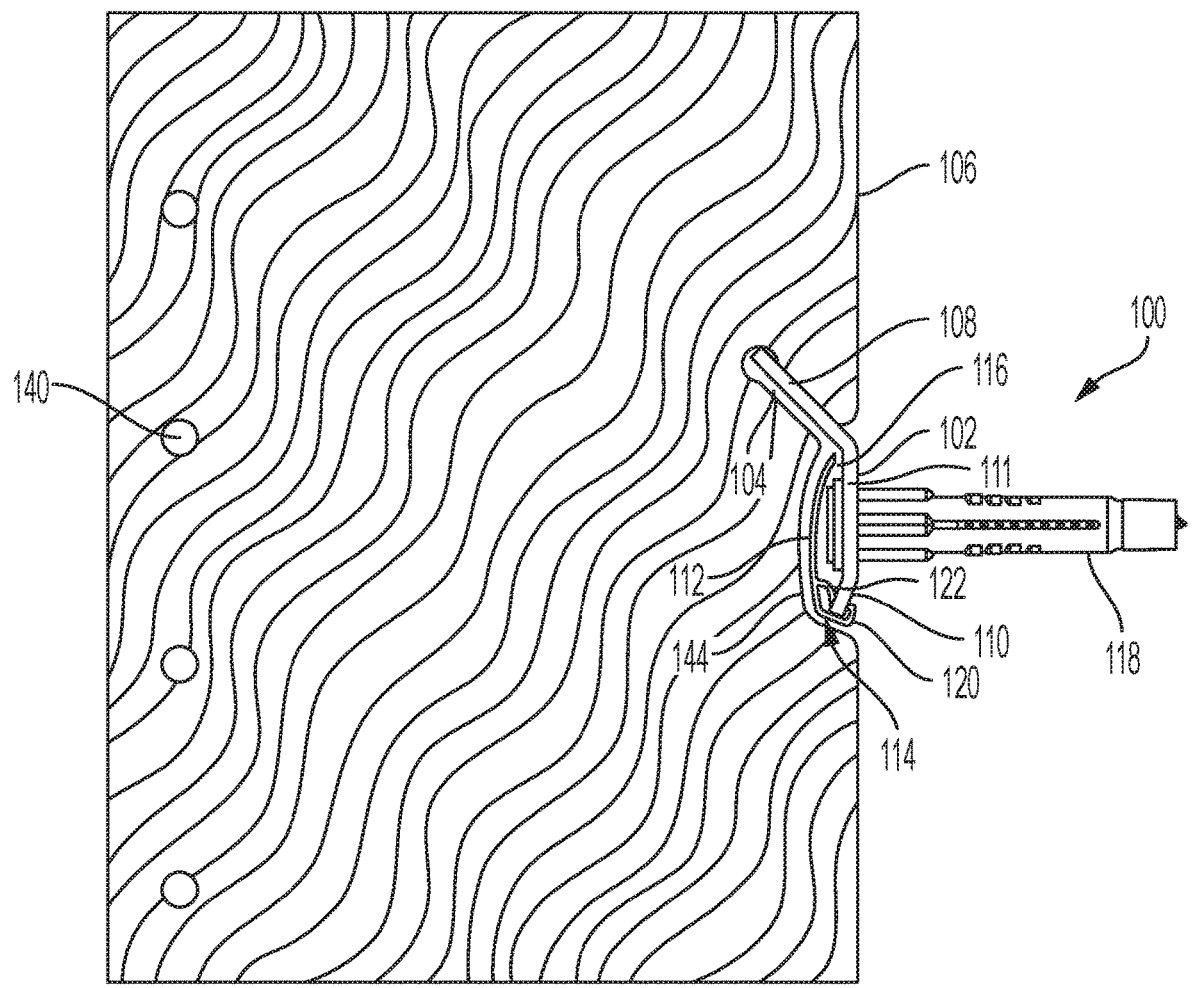
FIG. 4 illustrates a side view of a hanging rack assembly including a mounting rail interfacing with a groove of a surface, according to one or more embodiments shown and described herein.

While the mounting lip 24 described above extends upward from the lower or first edge 20 to the upper or second edge 22, a mounting lip may be provided at the second edge and extend away from the first edge. Referring to FIG. 4, a hanging rack assembly 100 may include many of the features described above including a mounting rail 102, a mounting lip 108 and rail cover 112. The mounting lip 108 may be sized to be inserted into a groove 104 of an adjustable hanging upright 106. The hanging rack assembly 100 includes the mounting lip 108 and a cover-guiding lip 110. The mounting lip 108 extends outwardly from a plane that is defined by a mounting base 111 to provide support between the mounting lip 108 and the surface 106. Similarly, the cover-guiding lip 110 extends outwardly from a plane that is defined by the mounting base 111 to provide additional support between a rail cover 112 and the adjustable hanging upright 106.

The rail cover 112 may include a mounting flange 114 that is sized to receive the cover-guiding lip 110 of the mounting rail 102. The rail cover 112 may partially or fully encase a height of the mounting rail 102. The rail cover 112 may have a height $h_1$ such that it at least partially encases a height $h_2$ of the mounting rail 102. The mounting flange 114 may further include a pair of retaining fingers 120 and 122 that are used to resiliently deflect and engage the cover-guiding lip 110 when it is positioned within the mounting flange 114.

Figure 5A:
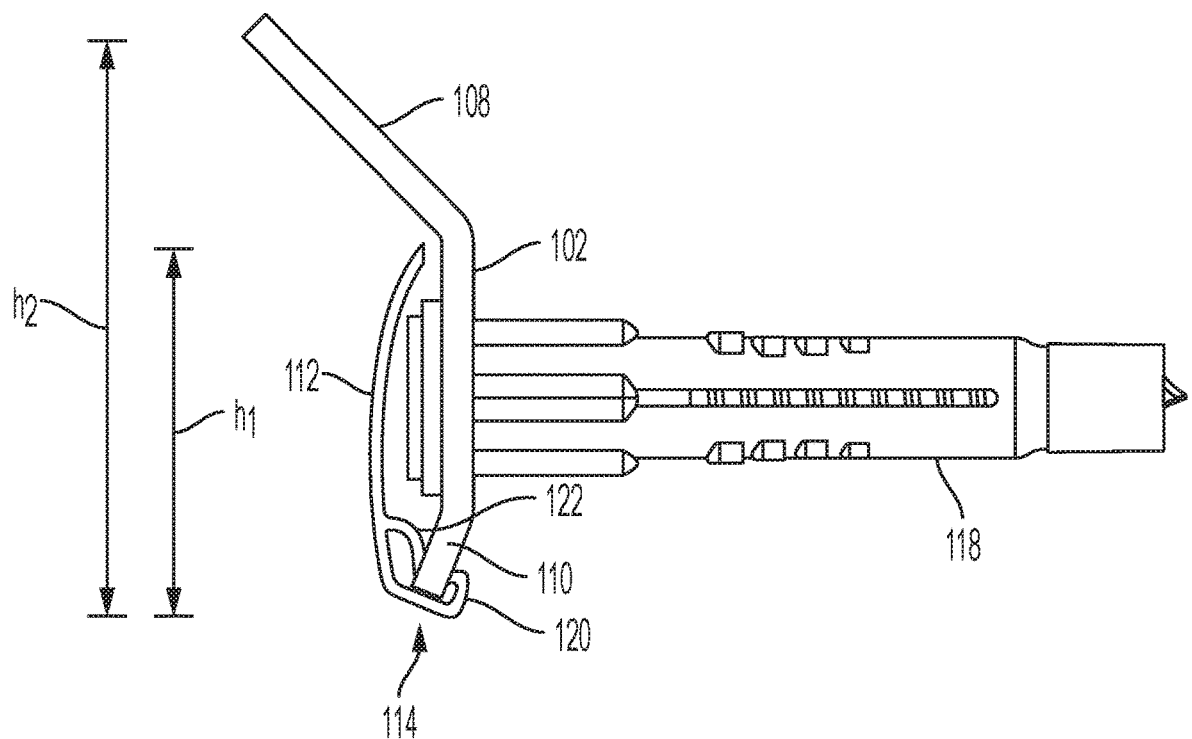
FIG. 5A illustrates a side view of the hanging rack assembly of FIG. 4.
Figure 5B:
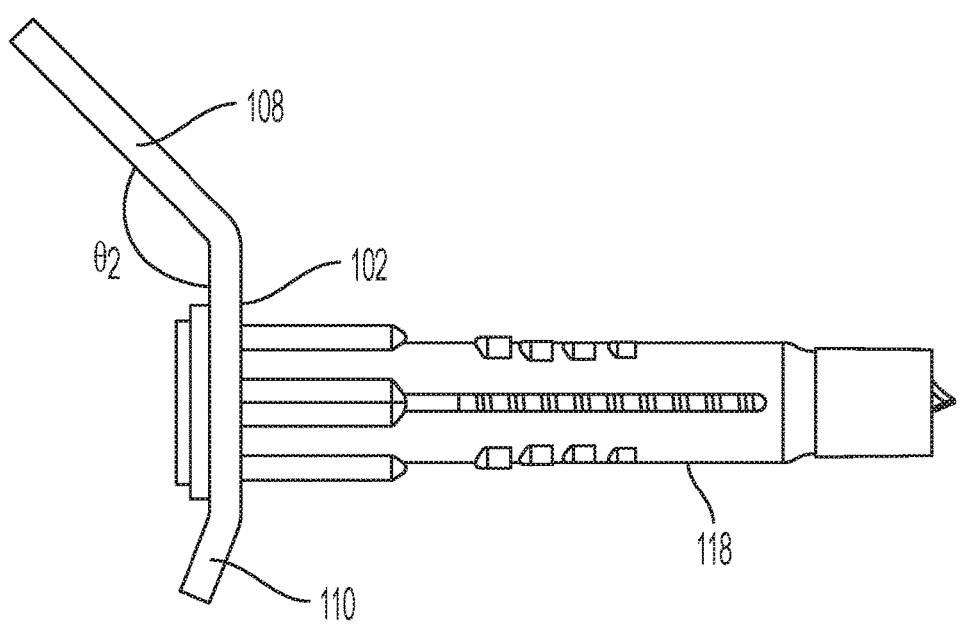
FIG. 5B illustrates a side view of the hanging rack assembly of FIG. 4, without a rail cover, according to one or more embodiments shown and described herein.
Figure 5C:
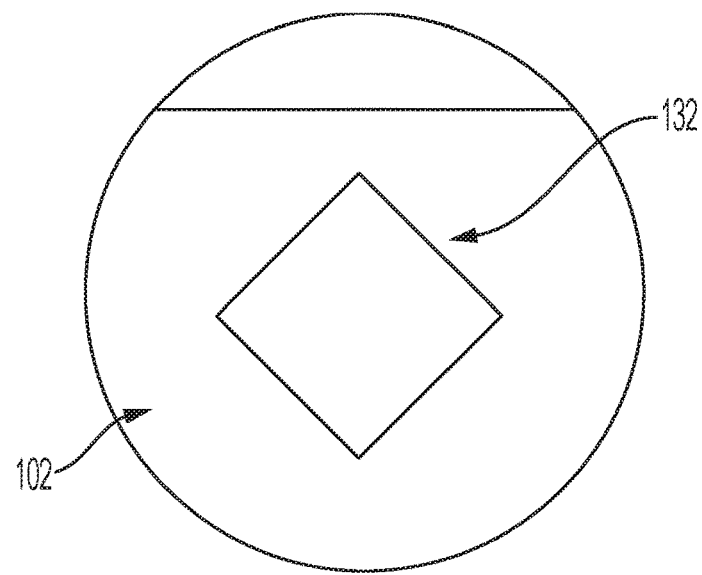
FIG. 5C is a detail view of a mounting rail of the hanging rack assembly of FIG. 4 illustrating a non-circular opening, according to one or more embodiments shown and described herein.

Referring to FIGS. 5A and 5B, the mounting lip 108 may extend outwardly from a first edge 116 of the of the mounting rail 102 at an angle $\theta_2$ from 90° to 145°, such as from 100° to 135° or from 105° to 125°. This range may allow the hanging rack assembly 100 to be inserted into various adjustable hanging uprights 106 having grooves 104 of different corresponding angles. In one or more embodiments, the mounting rail 102 may non-circular openings 132 (FIG. 5C). As described above, the non-circular openings 132 enable the wall mounting anchor 34 to be inserted into one of the non-circular openings 132 such that the anchor 118 does not spin during installation or subsequent use of the mounting rail 102, as described above.

According to embodiments, the non-circular openings may comprise any suitable non-circular shape. Examples of suitable non-circular shapes include substantially trapezoidal shapes such as rhombuses, squares, rectangles, parallelograms, or combinations thereof. In certain embodiments, the non-circular openings comprise rectangular shapes. In other embodiments, the non-circular openings comprise square shapes.

Figure 6:
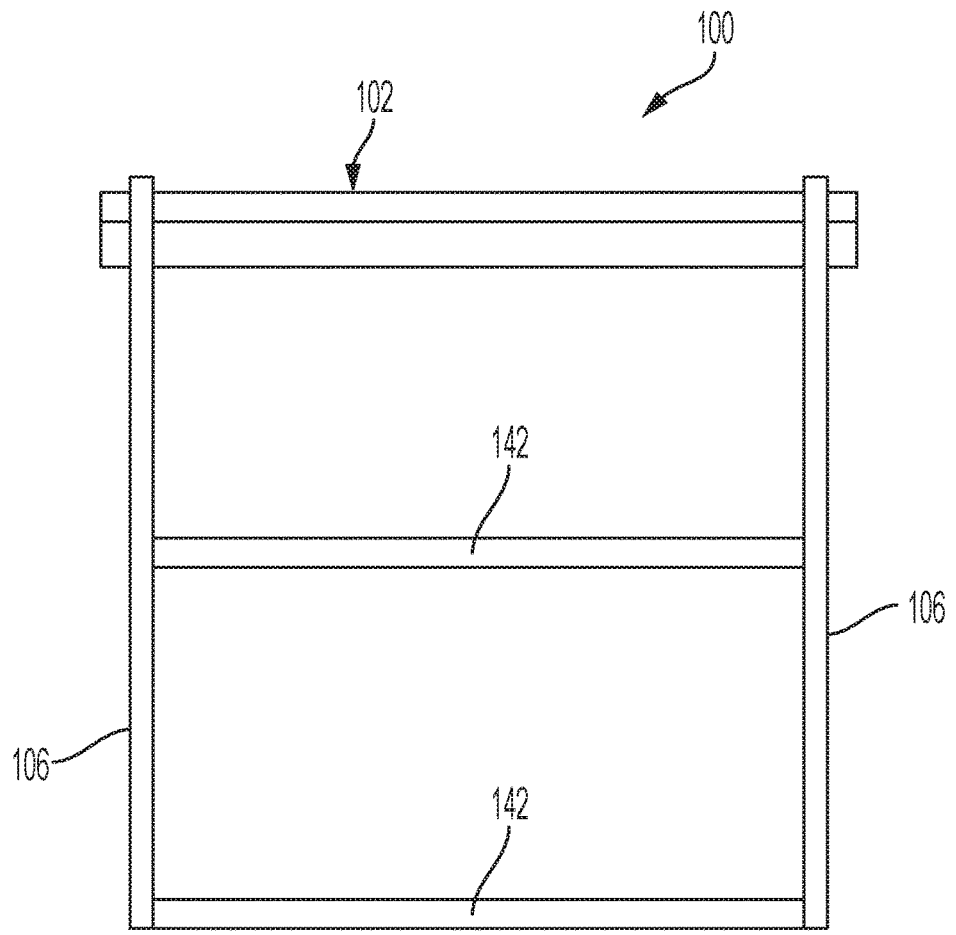
FIG. 6 illustrates a storage system using the hanging rack assembly of FIG. 4, according to one or more embodiments shown and described herein.

Referring to FIG. 6, in the embodiment of FIG. 4, the adjustable hanging upright 106 is in the form of a planar support wall (e.g., a board). The hanging rack assembly 100 including the mounting rail 102 and the support wall 106 may be used to support a variety of support walls 106 in order to form shelving for a storage system. For example, the support walls 106 may be formed of wood and include shelf support openings 140 (FIG. 4) that can be used to receive dowels of shelves 142 in order to support the shelves 142 in a horizontal fashion. Referring again to FIG. 4, the support walls 106 include a recessed portion 144 that can be used to provide clearance between the support walls 106 and the mounting rail 102 to allow the mounting rail to be slid side-to-side to readjust the positions of the support walls, as desired. Such an adjustable arrangement can facilitate design and redesign of a variety of storage systems or combinations thereof.

Thus, various embodiments of the hanging rack assembly have been described. Embodiments of methods of storing objects will now be described. The methods of storing objects described herein may include the hanging rack assembly according to any of the embodiments previously described.

In embodiments, a method of installing a mounting rail 12 includes mounting a hanging rack assembly 10 including a mounting rail 12 to a surface. The mounting rail 12 includes a mounting base 14. The mounting base 14 further includes a first end 16, a second end 18, a first edge 20 that extends between the first end 16 and the second end 18, and a second edge 22 that extends between the first end 16 and the second end 18. The mounting base 14 includes opposite faces that extend between the first end 16, the second end 18, the first edge 20, and the second edge 22. The mounting rail 12 includes a mounting lip 24 that extends outwardly from the second edge 22 toward the first edge 20. The mounting rail 12 further includes an adjustable hanging upright 26 comprising a plurality of apertures 28 on a front surface. The adjustable hanging upright 26 includes one or more slots 30 sized to slidingly receive the mounting lip 24. The mounting base 14 includes multiple non-circular openings 32 that are sized to receive an anchor 34 for mounting the mounting rail 12 to a surface.

It is noted that terms like "typically," when utilized herein, are not utilized to limit the scope of the disclosure or to imply that certain features are critical, essential, or even important to the structure or function of the disclosure. Rather, these terms are merely intended to identify particular aspects of an embodiment of the present disclosure or to emphasize alternative or additional features that may or may not be utilized in a particular embodiment of the present disclosure.

For the purposes of describing and defining the present disclosure it is noted that the term and "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

According to a first aspect of the present disclosure, a hanging rack assembly includes a mounting rail comprising a mounting base having a first end, a second end, a first edge that extends between the first and the second end, and a second edge that extends between the first end and the second end, the mounting base having opposite faces that extend between the first end, the second end, the first edge, and the second edge; and a mounting lip, wherein the mounting base comprises one or more non-circular openings sized to receive an anchor for mounting the mounting rail to a surface.

A second aspect of the present disclosure may include the first aspect, wherein the mounting rail comprises a cover-guiding lip that extends outwardly from the first edge and away from the second edge.

A third aspect of the present disclosure may include the first aspect or second aspect, wherein the hanging rack assembly further comprises a rail cover having a mounting flange sized to receive the cover-guiding lip of the mounting rail.

A fourth aspect of the present disclosure may include any of the first through third aspects, wherein the rail cover has a height $h_1$ such that it at least partially encases a height $h_2$ of the mounting rail.

A fifth aspect of the present disclosure may include any of the first through fourth aspects, wherein a clearance $h_3$ is provided between a bottom edge of the rail cover and the first edge of the mounting rail.

A sixth aspect of the present disclosure may include any of the first through fifth aspects, wherein the hanging rack assembly further comprises an adjustable hanging upright comprising a plurality of apertures on a front surface, the adjustable hanging upright having one or more slots sized to slidingly receive the mounting lip, the adjustable hanging upright including a rear portion and a slide-assisting recess that extends away from the mounting base allowing the adjustable sliding rail to slide side-to-side along the mounting lip.

A seventh aspect of the present disclosure may include any of the first through sixth aspects, wherein the adjustable hanging upright comprises a substantially U-shaped body having the front surface and two parallel side walls.

An eighth aspect of the present disclosure may include any of the first through seventh aspects, wherein the mounting lip extends outwardly from the second edge, toward the first edge and away from the mounting base at an angle $\theta_1$ from 10° to 45°.

A ninth aspect of the present disclosure may include any of the first through seventh aspects, wherein the mounting lip extends outwardly from the first edge of the mounting rail at an angle $\theta_2$ from 90° to 145°.

A tenth aspect of the present disclosure may include the first aspect, wherein the mounting lip extends outward from the first edge and away from the second edge.

According to an eleventh aspect of the present disclosure, a method of installing a mounting rail includes mounting the mounting rail on a surface; drilling through one or more non-circular openings located on a mounting base of the mounting rail; and inserting an anchor into one or more of the non-circular openings and the surface in order to secure the mounting rail to the surface, wherein the mounting rail comprises the mounting base having a first end, a second end, a first edge that extends between the first and the second end, and a second edge that extends between the first end and the second end, the mounting base having opposite faces that extend between the first end, the second end, the first edge, and the second edge; and a mounting lip.

A twelfth aspect of the present disclosure may include the eleventh aspect, wherein the mounting rail comprises a cover-guiding lip that extends outwardly from the first edge and away from the second edge.

A thirteenth aspect of the present disclosure may include the eleventh aspect or the twelfth aspect, wherein the mounting rail comprises a rail cover having a mounting flange sized to receive the cover-guiding lip of the mounting rail.

A fourteenth aspect of the present disclosure may include any of the eleventh through thirteenth aspects, wherein the rail cover has a height $h_1$ such that it at least partially encases a height $h_2$ of the mounting rail.

A fifteenth aspect of the present disclosure may include any of the eleventh through fourteenth aspects, wherein a clearance $h_3$ is provided between a bottom edge of the rail cover and the first edge of the mounting rail.

A sixteenth aspect of the present disclosure may include any of the eleventh through fifteenth aspects, wherein the mounting rail comprises an adjustable hanging upright comprising a plurality of apertures on a front surface, the adjustable hanging upright having one or more slots sized to slidingly receive the mounting lip.

A seventeenth aspect of the present disclosure may include any of the eleventh through sixteenth aspects, wherein the adjustable hanging upright comprises a substantially U-shaped body having the front surface and two parallel side walls.

An eighteenth aspect of the present disclosure may include any of the eleventh through seventeenth aspects, wherein the mounting lip extends outwardly from the second edge, toward the first edge and away from the mounting base at an angle $\theta_1$ from 10° to 45°.

A nineteenth aspect of the present disclosure may include any of the eleventh through seventeenth aspects, wherein the mounting lip extends outwardly from the first edge of the mounting rail at an angle $\theta_2$ from 90° to 145°.

A twentieth aspect of the present disclosure may include the eleventh aspect, wherein the mounting lip extends outward from the first edge and away from the second edge.

What is claimed is:

1. A hanging rack assembly comprising:
   a mounting rail comprising:
      a planar mounting base defining a plate having a first end, a second end, a first edge that extends between the first and the second end, and a second edge that extends between the first end and the second end, the mounting base having opposite faces that extend between the first end, the second end, the first edge, and the second edge;
      a mounting lip that extends outward directly from the first edge at an angle that is oblique to the mounting base;
      wherein the mounting base comprises an array of at least three or more spaced-apart, non-circular openings extending across the mounting base and located above a terminal edge of the mounting lip side-by-side in a line, each non-circular opening sized to receive an anchor for mounting the mounting rail through a thickness of the mounting base to a surface;
   the anchor comprising a body having a non-circular section that is configured to cooperatively engage one non-circular opening to inhibit spin of the anchor relative to the one non-circular opening during mounting the mounting rail to the surface, the anchor having the body that is hollow and sized and configured to receive a fastener that deforms the body and anchors the mounting rail to the surface;
   a rail cover that is formed separately from the mounting rail having a mounting flange sized to receive a cover-guiding lip of the mounting rail, wherein the rail cover has a height $h_1$ such that it partially covers a height $h_2$ of the mounting rail that includes the one or more non-circular openings;
   wherein a clearance $h_3$ is provided between a bottom edge of the rail cover and the first edge of the mounting base thereby exposing the mounting lip; and
   an adjustable hanging upright comprising a plurality of apertures on a front surface, the adjustable hanging upright having one or more slots sized to slidingly receive the mounting lip, the adjustable hanging upright including a rear portion having a slide-assisting recess above the one or more slots that extends vertically along and horizontally spaced-from the rail cover such that the rail cover is disposed between the slide-assisting recess and the planar mounting base, and allowing the adjustable hanging upright to slide side-to-side along the mounting lip.

2. The hanging rack assembly of claim 1, wherein the adjustable hanging upright comprises a substantially U-shaped body having the front surface and two parallel side walls.

3. The hanging rack assembly of claim 1, wherein the mounting lip extends outwardly from the first edge, toward the second edge and away from the mounting base at an angle $\theta_1$ from 10° to 45°.

4. The hanging rack assembly of claim 1, wherein the mounting lip extends outwardly from the first edge of the mounting rail at an angle $\theta_2$ from 90° to 145°.

5. A method of installing a mounting rail, the method comprising the steps of:
   locating a stud behind a wall;
   mounting the mounting rail on the wall such that a non-circular opening of an array of non-circular openings is aligned with the stud;
   inserting a fastener through the non-circular opening aligned with the stud and screwing the fastener into the stud without an anchor;
   drilling through another non-circular opening located on a mounting base of the mounting rail; and
   inserting the anchor into the another non-circular opening and the wall in order to secure the mounting rail to the wall, the anchor comprising a body having a non-circular section cooperatively engaging the another non-circular opening inhibiting spin of the anchor relative to the another non-circular opening, the anchor having the body that is hollow and sized and configured to receive a fastener that deforms the body and anchors the mounting rail to the wall, wherein the mounting rail comprises:
      the mounting base having a first end, a second end, a first edge that extends between the first and the second end, and a second edge that extends between the first end and the second end, the mounting base having opposite faces that extend between the first end, the second end, the first edge, and the second edge; and
      a mounting lip that extends outward from one of the first edge and the second edge.

6. The method of claim 5, wherein the mounting rail comprises a cover-guiding lip that extends outwardly from the first edge and away from the second edge.

7. The method of claim 6, wherein the mounting rail comprises a rail cover that is formed separately from the mounting rail having a mounting flange sized to receive the cover-guiding lip of the mounting rail.

8. The method of claim 7, wherein the rail cover has a height $h_1$ such that it partially covers a height $h_2$ of the mounting rail that includes the one or more non-circular openings.

9. The method of claim 8, wherein a clearance $h_3$ is provided between a bottom edge of the rail cover and the second edge of the mounting rail thereby exposing the mounting lip.

10. The method of claim 5, wherein the mounting rail comprises an adjustable hanging upright comprising a plurality of apertures on a front surface, the adjustable hanging upright having one or more slots sized to slidingly receive the mounting lip.

11. The method of claim 10, wherein the adjustable hanging upright comprises a substantially U-shaped body having the front surface and two parallel side walls.

12. The method of claim 5, wherein the mounting lip extends outwardly from the second edge, toward the first edge and away from the mounting base at an angle $\theta_1$ from 10° to 45°.

13. The method of claim 5, wherein the mounting lip extends outwardly from the first edge of the mounting rail at an angle $\theta_2$ from 90° to 145°.

14. The method of claim 5, wherein the mounting lip extends outward from the first edge and away from the second edge.

* * * * *